Figure 6:
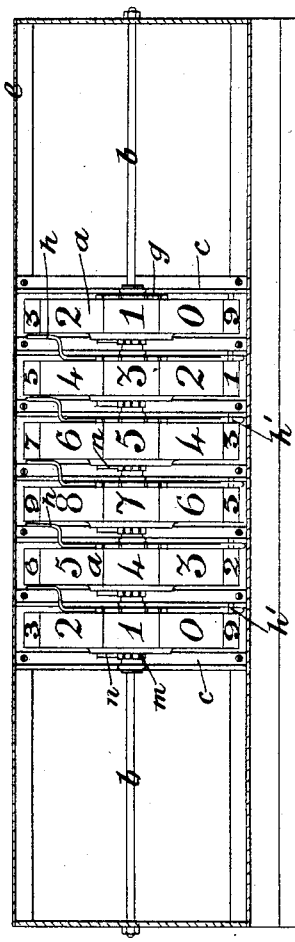

(No Model.)  4 Sheets—Sheet 1.
H. H. RUMBLE.
ADDING MACHINE.
No. 462,384.  Patented Nov. 3, 1891.
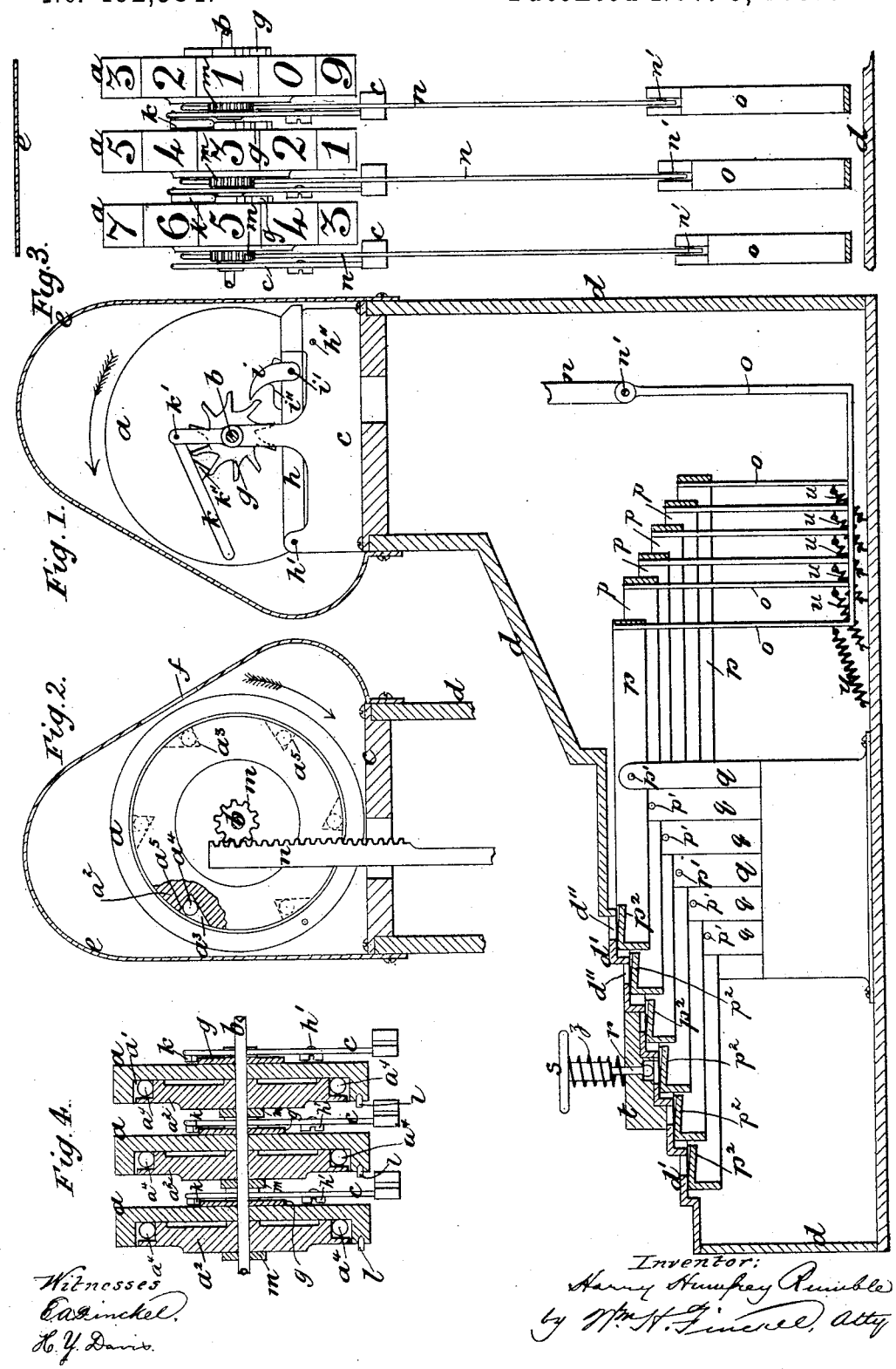
Witnesses
E. A. Zinckel
H. Y. Davis
Inventor:
Harry Humfrey Rumble
by Wm. H. Singerly, Atty (No Model.)
H. H. RUMBLE.
ADDING MACHINE.
No. 462,384. Patented Nov. 3, 1891.
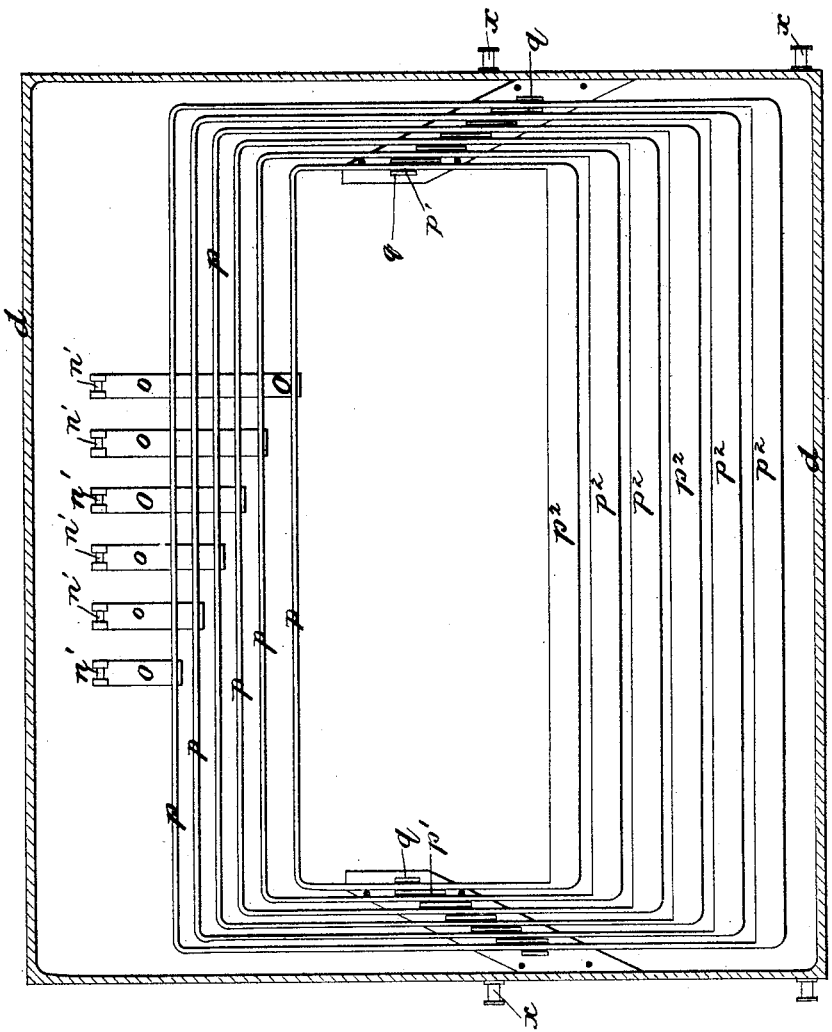

(No Model.)  
4 Sheets—Sheet 3.

H. H. RUMBLE.
ADDING MACHINE.

No. 462,384. Patented Nov. 3, 1891.

Witnesses  
E. A. Finckel  
H. Y. Davis

Inventor  
Harry Humphrey Rumble  
by Wm. N. Finckel atty

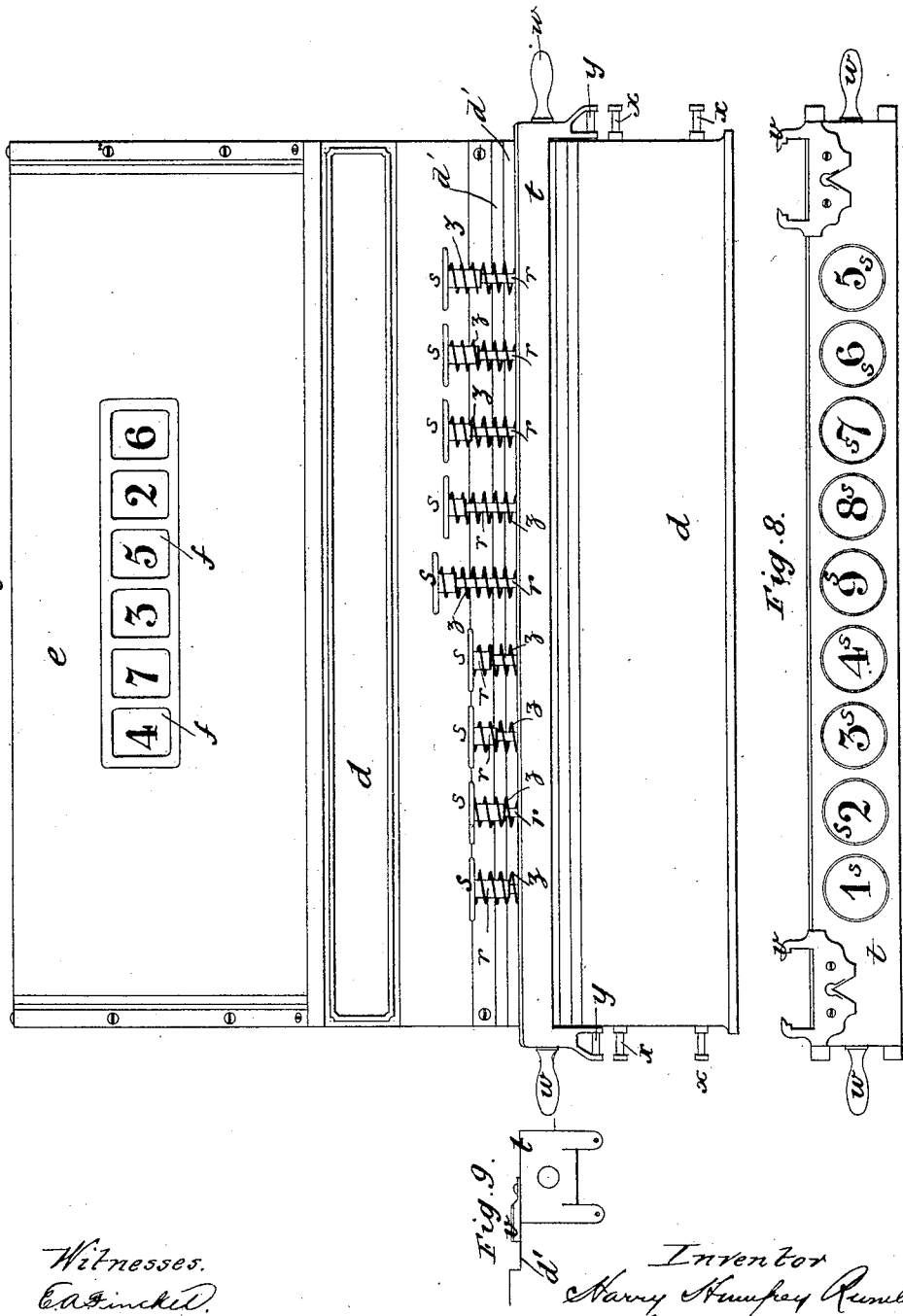

UNITED STATES PATENT OFFICE.

HARRY HUMFREY RUMBLE, OF WESTGATE-ON-SEA, ENGLAND.

ADDING-MACHINE.

SPECIFICATION forming part of Letters Patent No. 462,384, dated November 3, 1891.

Application filed September 26, 1890. Serial No. 366,238. (No model.) Patented in England September 15, 1890, No. 14,527.

*To all whom it may concern:*

Be it known that I, HARRY HUMFREY RUMBLE, architect, a subject of Her Majesty the Queen of Great Britain and Ireland, residing at 10 Adrian Square, Westgate-on-Sea, in the county of Kent, England, have invented new and useful Improvements in Adding-Machines, (the same having been patented in Great Britain under date of September 15, 1890, No. 14,527,) of which the following is a specification.

This invention relates to improvements in machinery or apparatus for adding figures. Its chief object is to produce at a moderate cost a simple and compact machine with as few parts as possible, which will be easy to manipulate and certain in action.

The apparatus I employ consists, essentially, of a series of indicating-disks representing different orders of numerals and bearing numerals consecutively arranged and equally spaced around their peripheries. These indicating-disks are connected with one another by a peculiar arrangement of "carrying" mechanism, and when caused to rotate indicate in progression through sight-apertures in a casing which incloses them the sum of the numbers added. The rotation of any of the indicating-disks is effected by the depression of any one of a series of operating-keys carried by a movable key-bar, each key of the series corresponding with a different numeral and being provided with a plunger, which when the key is depressed operates one of a set of rocking levers connected with the indicating-disks by mechanism hereinafter described. A separate rocking lever is required for each indicating-disk. I construct these rocking levers in the form of frames of varying size and dispose them so as to move independently, fitting one within the other. Each rocking lever carries a striking-plate of sufficient length to receive the impact of the plungers of the entire series of keys carried by the movable key-bar, and the machine is so constructed and arranged that any one of the set of rocking-lever frames may be operated upon in turn by the series of keys.

By way of example I shall describe and illustrate in the annexed drawings a machine arranged for performing simple addition or compound addition upon the decimal system, although it will be obvious that without departing in any way from the spirit of my invention it may readily be adapted for the addition of pounds, shillings, and pence, tons, hundred-weights, and quarters, and the like.

In the accompanying drawings, in which similar letters refer to corresponding parts in all the figures, Figure 1 is a sectional side elevation of a machine embodying my invention. Fig. 2 is a side view of one of the indicating-disks and its actuating-rack. Fig. 3 illustrates in front view some of the indicating-disks, together with their actuating-racks. Fig. 4 is a view of some of the indicating-disks in transverse section. Fig. 5 is a plan of the machine, showing clearly the arrangement of the rocking-lever frames, the upper part of the case being removed. Fig. 6 is a plan of the machine, the hood which covers the indicating-disks being removed. Fig. 7 shows the machine in front elevation complete. Fig. 8 is a plan of the movable key-bar. Fig. 9 is an end view of the same.

I will commence by describing the arrangement of the adding-disks.

$a$ $a$ are the indicating-disks, arranged side by side and revolving freely upon the spindle $b$, carried by the supports $c$, secured to the casing $d$. Six of these adding-disks are shown in the drawings, the machine therein illustrated being capable of indicating the sum of additions up to hundreds of thousands or (presuming the machine to be employed for the compound addition of dollars and cents) up to thousands of dollars.

Commencing at the right-hand side, Fig. 6, the disks are arranged in the following order: The first disk is for the addition of the lowest order or units, and I shall hereinafter refer to the same as the "units-disk." The second is for the addition of tens and hereinafter referred to as the "tens-disk." The third is the "hundreds-disk," the fourth the "thousands-disk," the fifth the "tens-of-thousands disk," and the sixth the "hundreds-of-thousands disk." The series of adding-disks may of course be extended, if desired.

Each adding-disk has ten equal divisions or spaces around its periphery, occupied by the numerals 1 to 9, arranged consecutively, and a 0. $e$ is a hood or cover secured to the casing $d$ and inclosing the indicating-disks $a$. $ff$ are sight-apertures in the hood $e$, through which the figures constituting the sum of the numbers added are viewed.

I will now describe the means I employ for effecting the operation of "carrying," so that when, for example, ten units have been added by rotating the units-disk, as hereinafter described, the corresponding amount in tens— viz., 1—will be indicated by the tens-disk.

Each indicating-disk, except the first or extreme right-hand disk, has secured thereto, on its right hand side, a ratchet-wheel $g$, the teeth of which correspond in number with the equal peripheral spaces or divisions of the disk to which it is secured. $h$ are levers pivoted at $h'$ to the supports $c$, their free ends resting upon the stop-pins $h''$. Each lever $h$ is provided with a pawl $i$, pivoted thereon at $i'$, and having a projection $i''$, which bears upon the upper part of the lever $h$ and keeps the pawl $i$ elevated. $k$ is a lever pivoted at $k'$ to the upper part of the support $c$, the detent $k''$ of which lever engages with the teeth of the ratchet-wheel $g$ and prevents the movement of the disk $a$ in the wrong direction. Each indicating-disk carries upon its left-hand side a projecting pin $l$, which pin, as the disk to which it is secured revolves and at the moment the zero thereof arrives at or passes the aperture $f$, strikes against the under side of the adjacent lever $h$ and raises the same, thereby causing the pawl $i$ of such lever to engage with the teeth of the ratchet-wheel $g$ of the adjoining disk $a$ of next higher order or denominations and move the same forward, the pin $l$ then slipping from off the end of the lever $h$, which falls back to its original position. The lever $h$ and pin $l$ must in each case be so proportioned and arranged as that the pin $l$ will slip off the end of and release the lever $h$ immediately the ratchet-wheel $g$ has been moved forward the distance of one tooth, which is equivalent to moving forward the disk $a$, to which the ratchet-wheel is secured, a distance equal to one of its peripheral divisions.

I will now describe the means I employ for effecting the movement of the adding-disks upon the depression of an operating-key.

Each indicating-disk $a$ is constructed with a concentric recess $a'$ upon the opposite side to its ratchet-wheel $g$, within which recess $a'$ fits freely a clutch-disk $a^2$, also mounted loosely on the spindle $b$. This clutch-disk $a^2$ carries a pinion-wheel $m$, engaged by a rack $n$.

$a^3$ are notches formed around the periphery of the clutch-disk $a^2$, each notch containing a ball $a^4$. By referring to Fig. 2 it will be seen that these notches $a^3$ resemble in shape the teeth of a ratchet-wheel, deepening gradually from the periphery of the clutch-disk $a^2$ and then terminating in an abrupt wall $a^5$. When the clutch-disk $a^2$ is rotated in the direction of the arrow, Fig. 2, by the elevation of the rack $n$, as hereinafter explained, such of the balls $a^4$ as are in contact with both the disks $a$ and $a^2$ will rotate the disk $a$. When, however, the clutch-disk $a^2$ is rotated in the reverse direction, upon the return of the rack $n$ to its normal position the balls $a^4$ will be pushed back to the deep portions of the notches $a^3$ and the clutch-disk $a^2$ be free to revolve independently of the disk $a$. The lower end of each rack $n$ is pivoted at $n'$ to an arm $o$, secured to a lever-frame $p$, rocking on pivots $p'$, carried by supports $q$, secured to the casing $d$. I construct these rocking-lever frames $p$ of varying sizes and dispose them fitting within one another and working independently of each other, preferably at slightly-different levels, (see Figs. 1 and 5,) thus effecting great economy of space and other advantages. Each rocking-lever frame is pivoted to separate supports $q$, a separate rocking-lever frame $p$, connecting-arm $o$, and rack $n$ being required for each indicating-disk $a$.

$p^2$ are striking-plates carried by the rocking-lever frames $p$, against which striking-plates the plungers $r$ of the actuating-keys $s$ strike when depressed, thus raising the rack $n$ of the lever-frame $p$ operated upon, and consequently rotating the disk $a$ engaged thereby, as before explained.

$u$ $u$ are springs connected with the arms $o$ of the rocking-lever frames $p$ for the purpose of restoring them to their original position without delay when the key-pressure is released.

I will now describe the arrangement of the actuating-keys. Nine actuating-keys $s$ are employed, numbered from 1 to 9 and carried by the movable key-bar $t$, which is so constructed as to fit over any one of a series of steps or projections $d'$, formed on the casing $d$, each step or projection $d'$ being situated immediately above the striking-plate $p^2$ of a rocking-lever frame $p$ and provided with apertures $d''$ for the passage of the key-plungers $r$. By shifting the key-bar $t$ to various steps $d'$ the keys carried thereby may be caused to operate in turn upon the striking-plates of all the rocking lever frames $p$. The amount of depression permitted to every key $s$ and the position of the pivots or fulcra $p'$ of the rocking-lever frames $p$ must be so arranged and adjusted that whatever rocking-lever frame $p$ is being operated by the keys such rocking frame will, when a key is depressed, advance the indicating-disk $a$ with which it corresponds, by means of its arm $o$ and rack $n$, as many peripheral divisions as the number marked upon the key depressed. Thus, for example, when the key marked 7 is depressed the rocking-lever frame $p$ acted upon must elevate its rack $n$ sufficiently to advance the disk $a$ with which it is connected seven peripheral spaces or divisions; or, in other words, supposing the 0 (or zero) on such disk $a$ to be opposite the sight-aperture $f$, on depressing the key marked 7 the disk $a$ will be rotated until the figure "7" thereon appears opposite the sight-aperture $f$. When the key marked 1 is depressed, the rocking-lever frame acted upon must advance its corresponding disk $a$ one peripheral division, and so on, the keys which bear the highest numerals being permitted the greatest amount of depression.

$v$, Fig. 8, are pointers or indexes upon the key-bar $t$, which show the operator (according to which denomination engraved upon the casing $d$, Fig. 6; they point) upon which of the indicating-disks he is acting. When, for instance, the keys $s$ of the key-bar $t$ are disposed so as to operate upon the striking-plate of the rocking-lever frame connected with the units-disk the indexes or pointers $v$ will point to the word "units" upon the casing $d$, and so on. $w$ are handles for moving the key-bar $t$. In order to maintain the key-bar $t$ in position upon whichever of the steps $d'$ it is placed, rubber bands may be slipped over the pins $x$ upon the casing $d$ and around the pins $y$ on the key-bar. $z$ are springs for raising the keys $s$ after they have been depressed.

The action of the apparatus is as follows: When any key $s$ is depressed, its plunger $r$ comes into contact with and forces down the striking-plate $p^2$ of the rocking-lever frame $p$ above which it is disposed. The opposite end of the rocking-lever frame $p$ is consequently raised, and by its connecting-arm $o$ elevates the rack $n$, pivoted thereto, and advances by the pinion-wheel $m$ and clutch arrangement hereinbefore described its corresponding indicating-disk $a$ as many peripheral divisions as the number marked upon the key depressed. Whenever the zero upon an indicating-disk $a$ operated upon reaches or passes the sight-aperture $f$ in the hood $e$, the adjacent indicating-disk of next higher order or denomination to the left is advanced one peripheral division by the carrying mechanism, as before explained. Suppose it is desired to add 267 to 849. The adding-disks $a$ are first adjusted so that nothing but zeros are visible through the sight-apertures $f$. The key-bar $t$ is now placed upon the uppermost step $d'$ of the case $d$, when its indexes $v$ will point to the word "units" on the casing, and the plungers $r$ of its keys $s$ will be situate over the striking-plate of that rocking-lever frame $p$ which corresponds with the units-disk. The key marked 9 is depressed, which advances the units-disk, as before explained, nine peripheral divisions, and "9" appears through the sight-aperture $f$. The key marked 7 is then struck, the units-disk moves seven more peripheral divisions, and consequently the "6" thereon shows through the aperture $f$, while as the "0" passes such aperture the pin $l$ upon the units-disk moves the tens-disk one peripheral division, and the total shown is "16." The key-bar $t$ is now pulled down to the next step $d'$ below, its indexes pointing to the word "tens" on the casing. The 4 key is struck, the tens-disk moves four peripheral divisions, and "56" appears. The 6 key is then depressed and the tens-disk moves six more peripheral divisions, causing the "1" thereon to arrive at the sight-aperture $f$, while as the "0" passes such aperture the pin $l$ on the tens-disk advances the hundreds-disk one peripheral division. The total then reads "116." The key-bar $t$ is then moved to the step $d'$, situated over the striking-plate of the rocking-lever frame connected with the hundreds-disk, its indexes pointing to "hundreds." The 8 key is depressed, the hundreds-disk advanced eight peripheral divisions, and "916" appears. The 2 key is then struck and the total "1116" will show through the sight-apertures $f$.

I prefer to arrange the series of keys carried by the key-bar $t$ in the order shown in Fig. 8, both hands being employed to operate the same. This arrangement leaves the keys requiring the greatest amount of depression to the stronger or right hand, while in each hand the weaker or third and fourth fingers have the least work to do. The elevation of the center keys will effectually guide the operator's hands into position and remove all risk of mistakes.

In conclusion I would observe that I am aware that a series of rotating indicating-disks connected with one another by carrying mechanism and operated through connections by keys have before been proposed in adding-machines, and therefore I do not claim the same, broadly, as my invention.

What I claim, and desire to secure by Letters Patent of the United States, is—

1. In an adding-machine, the combination, with a series of adding-disks, of carrying mechanism connecting the same, a set of rocking-lever frames (one for each adding-disk) constructed and arranged as described, means for causing the adding-disks to rotate upon motion being imparted to the rocking-lever frames, a movable key-bar, and a series of numbered keys carried thereby and adapted to operate upon more than one of the rocking-lever frames, substantially as described and illustrated.

2. In an adding-machine, the combination, with a series of adding-disks, of carrying mechanism connecting the same, a set of rocking-lever frames, (one for each adding-disk,) rack and pinion, and friction-clutch connections, as described, between each rocking-lever frame and each adding-disk, and a series of numbered keys operating upon the rocking-lever frames, substantially as described and illustrated.

3. In an adding-machine, the combination, with a series of adding-disks, of carrying mechanism connecting the same, a set of rocking-lever frames disposed and working independently one within the other, connected with the adding-disks, striking-plates carried by the rocking-lever frames, and a set of keys operating upon the said striking-plates, substantially as described and illustrated.

4. In an adding-machine, the combination of a set of rocking-lever frames, striking-plates carried thereby, a series of adding-disks, a casing formed with a series of steps or projections, each step or projection being situated over the striking-plate of a rocking-lever frame, and a movable key-bar carrying a series of keys and adapted to fit onto any of the steps or projections in the casing, so that any of the rocking-lever frames may be operated by the said keys, substantially as specified.

5. In an adding-machine comprising a series of adding-disks, carrying mechanism connecting the same, and a set of operating-keys, the rocking-lever frames $p$, disposed and working independently one within the other and carrying striking-plates $p^2$ for the key-plungers, substantially as described and illustrated.

6. In an adding-machine, the combination of an adding-disk $a$, recessed on one side, a clutch-disk $a'$, a pinion-wheel $m$, carried thereby, a rack $n$, engaging with such pinion-wheel, a rocking-lever frame $p$, connected with the rack $n$, and a striking-plate $p^2$ upon the rocking-lever frame $p$, substantially as described and illustrated.

In witness whereof I have signed my name in the presence of two subscribing witnesses.

HARRY HUMFREY RUMBLE.

Witnesses:
A. E. ALEXANDER,
*Patent Agent,* 19 *Southampton Bldgs., London.*
CHAS. G. REED,
*His Clerk.*